United States Patent [19]
McArthur et al.

[11] Patent Number: 5,499,650
[45] Date of Patent: Mar. 19, 1996

[54] FLUID CONTROL VALVE FOR A HYDRAULIC SYSTEM OPERATING WITH VARIABLE VISCOSITY, CONTAMINATED, FLUID

[75] Inventors: Malcolm J. McArthur, Escondido, Calif.; Harvey Jansen, Tempe, Ariz.

[73] Assignee: Sundstrand Corporation, Rockford, Ill.

[21] Appl. No.: 335,272

[22] Filed: Nov. 7, 1994

[51] Int. Cl.$^6$ .................................................. G05D 16/20
[52] U.S. Cl. ...................... 137/85; 137/116.3; 137/468; 137/625.2; 137/625.45; 137/625.65
[58] Field of Search ................... 137/85, 116.3, 137/468, 625.2, 625.45, 625.65

[56] References Cited

U.S. PATENT DOCUMENTS

| | | | |
|---|---|---|---|
| 1,763,994 | 6/1930 | Thoma | 137/625.2 X |
| 3,081,787 | 3/1963 | Meuledyk | 137/85 X |
| 3,234,967 | 2/1966 | Munn | 137/625.45 |
| 3,583,430 | 6/1971 | Toennesen | 137/468 |
| 3,805,835 | 4/1974 | Jansen | 137/625.3 |
| 4,046,061 | 9/1977 | Stokes | 91/459 |
| 4,071,042 | 1/1978 | Lombard | 137/116.3 X |
| 4,773,439 | 9/1988 | Coates-Smith | 137/102 |
| 4,949,752 | 8/1990 | Nogle et al. | 137/596.17 |

*Primary Examiner*—Robert G. Nilson
*Attorney, Agent, or Firm*—Lawrence E. Crowe

[57] ABSTRACT

Problems such as slow frequency response and low reliability when operating with contaminated fluids of variable viscosity are alleviated in a low pressure hydraulic system (10) which utilizes a single stage, electro-hydraulic, clevis-type pressure control valve (40). The valve (40) includes a control piston (106) referenced to a control pressure within a control pressure cavity (60) to provide a feedback of control pressure which converts the valve (40) from an integral to a proportional control device, thereby enhancing stability of the hydraulic system (10). Compensation for changes in fluid viscosity, as a result of changes in fluid temperature, is provided by fabricating a bifurcated portion (98) and/or a metering bridge portion (62) of the valve (10) from materials having dissimilar coefficients of thermal expansion. Exemplary embodiments of a hydraulic system (10) suitable for use in either vehicular or stationary applications involving pressure actuated devices, such as a clutch (16), automatic transmissions or anti-lock brakes, are provided.

40 Claims, 4 Drawing Sheets

FLUID CONTROL VALVE FOR A HYDRAULIC SYSTEM OPERATING WITH VARIABLE VISCOSITY, CONTAMINATED, FLUID

TECHNICAL FIELD

This invention relates to hydraulic systems generally, and more particularly to a hydraulic system which requires that a fluid control valve provide rapid actuation and stable operation of a pressure actuated device, despite variations in viscosity and possible contamination of the hydraulic fluid.

BACKGROUND

Hydraulic systems in vehicular applications, such as transmissions or braking systems, must engage controllably, responsively and reliably in order to perform their function. The same is true for hydraulically actuated clutches, or other power transmitting apparatus, used in stationary emergency power generators which supply electricity to a computer or a hospital for instance, in the event of a power outage in a municipal power grid.

A typical hydraulic system in these applications includes a pump or other source of pressurized fluid, a low pressure reservoir, a source of control signals, a fluid actuated device, and a fluid control valve. These components are connected to form a fluid circuit in which the valve receives a flow of pressurized fluid from the pump. The valve converts a portion of that flow of pressurized fluid into control flow or pressure that is then supplied to the fluid actuated device in response to control signals received from the source or control signals. The remaining small leakage portion of the flow of pressurized fluid passes through the valve and returns to the low pressure reservoir.

Such hydraulic systems must be capable of responding quickly when they are needed, despite the fact that the hydraulic fluid may have become highly viscous during a prolonged period of inoperation coupled with exposure to extremely cold ambient temperatures. Such highly viscous fluid does not flow readily, however, thus making it difficult to achieve rapid response. Furthermore, once the system has been actuated, the fluid will begin to warm up and become less viscous, due to frictional and dynamic losses in the fluid circuit. This change in viscosity can create significant difficulties in maintaining stable control. Therefore, in order to maintain stable control, the components of the hydraulic system should ideally include compensation features which allow the system to operate satisfactorily over a wide range of fluid temperatures and viscosity.

In addition, hydraulic control systems in both vehicular or stationary applications are subject to contamination. Such contaminations can cause control elements within the fluid circuit to jam, or stick, thereby preventing the valve from functioning properly.

In the past, designers of hydraulic systems have been compelled, by lack of acceptable alternatives, to utilize high fluid pressures, two-stage valves, or fluid heating/cooling devices in systems such as those described above. The heating/cooling devices were utilized to maintain fluid temperature and viscosity within a narrow range to alleviate control problems incident with changing fluid viscosity, as discussed above. High fluid pressures are undesirable because they require excessive pumping power, thereby increasing operational cost. Two-stage valves and heating/cooling devices add undesirable complexity and initial cost of the system. Heating/cooling devices which require external power may also increase operational costs. In other prior hydraulic systems without dedicated heating and cooling devices, it was sometimes necessary to run the pump for some period of time prior to attempting to engage the fluid actuated device, in order to let the fluid warm up to a temperature at which the valve would provide stable, responsive control. This warm up period was a waste of fuel. Furthermore, the time required for warm up sometimes resulted in unacceptable delays in the operational readiness of the hydraulic system.

The fluid actuated device, in a typical hydraulic system of the type described above, is a clutch or brake utilized to controllably start or stop a mechanical load, such as drivetrain or a wheel. In general, drivetrains and wheels are mechanical loads having components of inertia, variable torque, and viscous drag. The inertial load results in a system that has an integral time relationship between applied torque and resulting speed. If a simple flow control valve is utilized, for instance, a double integration occurs in the overall control algorithm, making it difficult to achieve stability. Specifically, this double integration occurs because the relationship between the flow control valve and the clutch creates a second time integral relationship between the control valve input and the resulting torque applied by the clutch. The combined effect of these two time integral relationships leads to difficulties in maintaining system stability. If, on the other hand, a pressure control valve with feedback of control pressure is used, the valve/clutch characteristic is proportional rather than integral in nature. No double integration occurs, and stability is thus much easier to achieve.

What is needed then is a hydraulic system including a low pressure, single stage, pressure control valve with internal feedback of control pressure. The valve must be capable of operating over a wide range of viscosities without the need for heating/cooling devices in the fluid circuit. The valve must also work reliably despite the presence of contamination within the fluid. It is also highly desirable that the hydraulic control system provide a constant relationship between the magnitudes of the control signal input and the acceleration rate of the drive mechanism.

Previously known pressure servo control valves fall short of meeting these requirements. Generally, the previously known pressure servo control valves are of the two stage hydraulic amplified type. These valves use closely fitting movable spools, or small flapper/orifice type valves. These valves are more prone to failure due to contamination, and slow response with higher viscosity fluids.

U.S. Pat. No. 3,805,835 to Harvey B. Jansen, a co-inventor of the present invention, describes a fluid flow control valve which utilizes a bifurcated clevis member that is shiftable across a pair of opposed metering orifices to precisely control flow of a fluid. By virtue of its construction, the Jansen '835 flow control valve is more tolerant of contaminated fluids than other types of flow control valves. The bifurcated clevis tends to scrape away contaminant deposits which could plug metering orifices or cause sticking of movable metering elements in other types of flow control valves. The structure of the Jansen '835 valve also minimizes mechanical hysteresis of the valve, and requires less power for actuation than other types of flow control valves. Frequency response of the Jansen '835 valve is also excellent, even at high operating frequencies.

The Jansen '835 valve is a flow control valve, however, rather than a pressure control valve of the type required to solve the problems addressed by the present invention.

Despite the fact that the Jansen '835 valve is a flow control, the inventors of the present invention recognized that portions of the structure of that valve might be well suited for use with the viscous and possibly contaminated fluids encountered in hydraulic control systems of the type addressed herein, provided that those desirable features of the Jansen '835 flow control valve could be incorporated into a remotely controllable pressure control valve. In addition to integrating the desirable features of the Jansen '835 flow control valve into a pressure control valve, a feedback of control pressure is desired for achieving optimal responsiveness and stability of the hydraulic system.

SUMMARY

Our invention overcomes the problems described above and provides a stable, rapidly responding hydraulic system, offering improved resistance to contamination, that is suitable for use in either vehicular or stationary hydraulic systems operating with fluids of varying viscosity.

According to one aspect of our invention, the hydraulic system includes a source of pressurized fluid, a low pressure reservoir, a source of control signals, a pressure actuated device, and a clevis-type fluid pressure control valve. The clevis-type pressure control valve provides inherent resistance to contamination. The clevis-type valve also provides improved stability and frequency response in comparison to prior hydraulic systems utilizing flow control valves having tightly fitting spools, needles, flappers or other movable control elements. The clevis-type fluid pressure control valve further allows the hydraulic system of our invention to operate at lower pressure differentials than prior hydraulic systems, thereby reducing operating power requirements. According to another aspect of our invention, the clevis-type fluid pressure control valve includes an internal feedback of control pressure to enhance system stability by providing a control valve having a characteristic in which the response is proportional rather than integral with respect to the input signal. In a preferred embodiment of our invention, this feedback is referenced to an outlet pressure of the valve.

According to yet another aspect of our invention, the clevis-type fluid pressure control valve includes features which compensate for changes in fluid viscosity, due to changes in operating temperature of the fluid. This compensation is provided in a straightforward manner by constructing certain members of the clevis-type control apparatus from materials having dissimilar coefficients of thermal expansion. By virtue of this construction, the leakage flow from the inlet to the outlet pressure port can be minimized at high fluid temperatures, while still maintaining an acceptable working clearance at low fluid temperatures, such that rapid system response is provided across a wide range of fluid temperatures and viscosities.

In a preferred embodiment of the invention, both inlet and outlet metering orifices are provided as part of the clevis-type control apparatus to improve the frequency response of the valve. A portion of the clevis-type apparatus may also be preferentially biased to alternatively provide an initial valve position having: 1) a closed inlet and a closed outlet; 2) an open inlet and a closed outlet; or 3) a closed inlet and an open outlet.

These and other aspects and advantages of our invention will be apparent to those skilled in the art upon consideration of the following drawing figures and detailed description of various exemplary embodiments of our invention.

DESCRIPTION OF THE INVENTION

Figure 1:
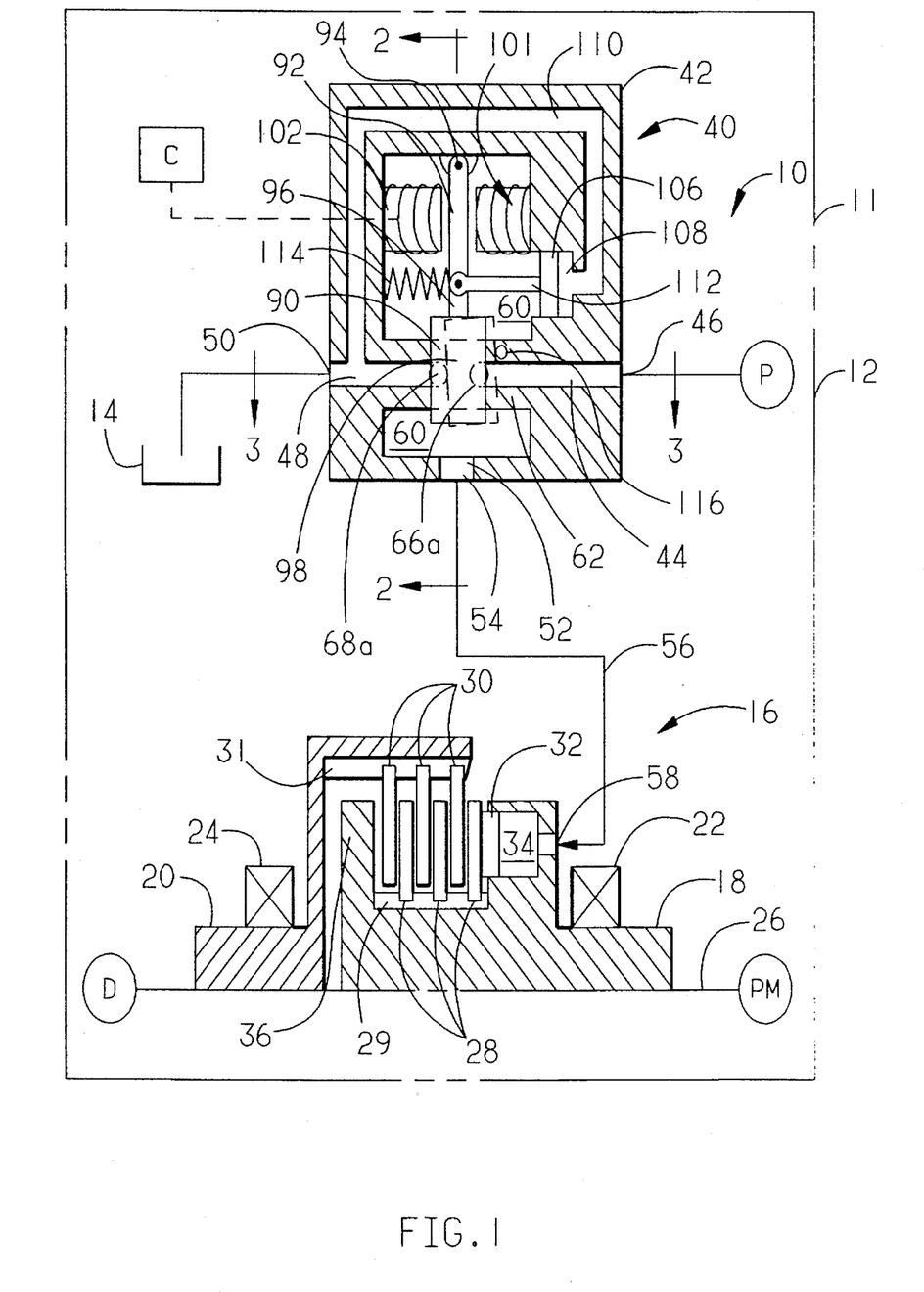
FIG. 1 depicts an exemplary embodiment of a hydraulic system for a vehicle or a stationary power plant, according to the invention, and includes cross sectional views of a fluid control valve and a hydraulic clutch which are components of that hydraulic system.

FIG. 1 depicts an exemplary embodiment of our invention in the form of a hydraulic system, generally illustrated as reference numeral 10, for a vehicle 11, or a stationary power conversion plant 12. The hydraulic system 10 of the exemplary embodiment includes: a source of pressurized fluid, in the form of a pump 'P'; a low pressure reservoir 14; a source of control signals 'C'; a pressure actuated device, in the form of a clutch 16; and a clevis-type fluid pressure control valve 40.

Although we have elected to use a clutch 16 as the pressure actuated device in the exemplary embodiments depicted herein, we wish to specifically emphasize that our invention is not limited to hydraulic systems controlling clutches. Our invention is equally applicable to hydraulic systems controlling many other types of pressure actuated devices including: brakes, anti-lock or otherwise, of a type used to stop a vehicle; or movable control elements of power transmission devices, such as automatic transmissions.

The clutch 16 includes an input shaft 18 and an output shaft 20 journaled respectively in bearings 22, 24 for rotation about a common axis 26. The input shaft 18 is operatively connected to a prime mover 'PM', such as an engine or electric motor, to receive power therefrom for rotating the input shaft 18 about the axis 26. The output shaft 20 is operatively coupled to a driven apparatus 'D' in such a manner that the output shaft 20 will drive the driven apparatus D when the output shaft 20 is rotated about the axis 26. The term driven apparatus as used herein encompasses many types of devices including, inter alia: geartrains, electrical generators, compressors and pumps.

Operative connection between the input and output shafts 18, 20 is provided by a series of interleaved annular shaped drive plates 28 and driven plates 30. The drive plates 28 are attached to the input shaft 18 by a spline 29 in such a manner that they may slide axially along the spline 29, but are constrained to rotate with the input shaft 18. In similar fashion, the driven plates 31 are attached to the output shaft 20 by a spline 30 in such a manner that they may slide axially along the spline 31, but are constrained to rotate with the output shaft 20. The input shaft 18 further includes, at the left axial end thereof as depicted in FIG. 1, an integral flange 36, and at the right axial end thereof a piston 32 mounted to slide axially within a cylinder 34 defined by the input shaft 18. The interleaved drive and driven plates 28, 30 are sandwiched between the flange 36 and the piston 32, such that when fluid pressure is supplied to the cylinder 34, the piston 32 will move toward the left. As the piston 32 moves toward the left, the drive and driven plates 28, 30 are compressed tightly against one another and against the flange 36, thereby causing the clutch to engage and transmit torque from the prime mover PM to the driven apparatus D.

When fluid pressure is released from the cylinder 34, a return spring (not shown) urges the piston 32 and the drive and driven plates 28, 30 to move toward the right, away from the flange, thereby disengaging the prime mover PM from the driven apparatus D.

As illustrated in FIG. 1, the fluid pressure control valve 40 includes a body member 42 defining a fluid inlet passage 44 having an inlet port 46 for receiving pressurized fluid from the source of pressurized fluid P, and a fluid outlet passage 48 having an outlet port 50 for delivering that pressurized fluid to the low pressure reservoir 14. The valve 40 also includes a control pressure passage 52 having a control pressure port 54 for communicating a control pressure to the cylinder 34 of the clutch 16. This control pressure is communicated to the clutch 16 via a conduit 56 connected between the control pressure port 54 and inlet means 58 of the clutch 16, with the inlet means 58 being in fluid communication with the cylinder 34. The valve body 42 further defines a control pressure cavity 60 which provides fluid communication between the inlet, outlet and control pressure passages 44, 48, 52 of the valve 40.

Figure 2:
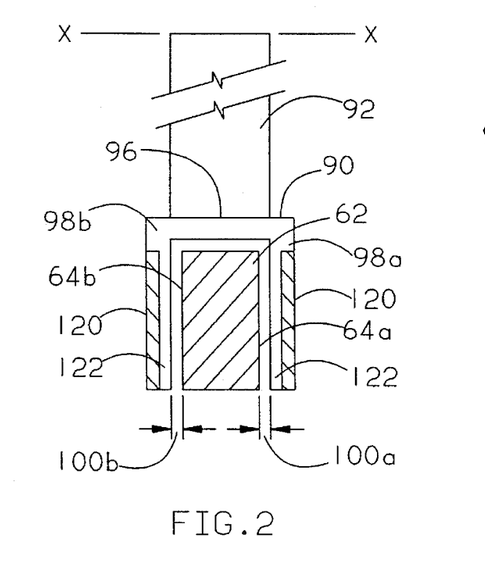
FIGS. 2, 2a, 2b and 3 are auxiliary views depicting various elements and features of the valve of FIG. 1.
Figure 3:
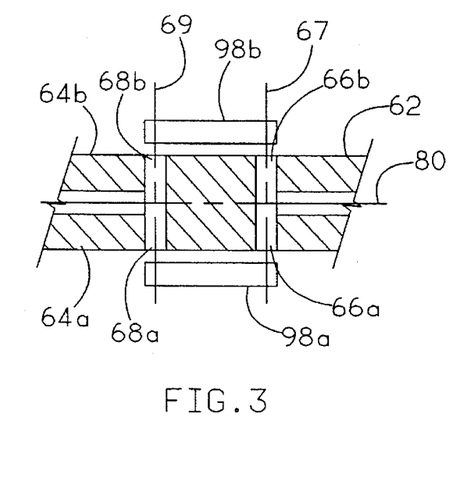
Figure 4:
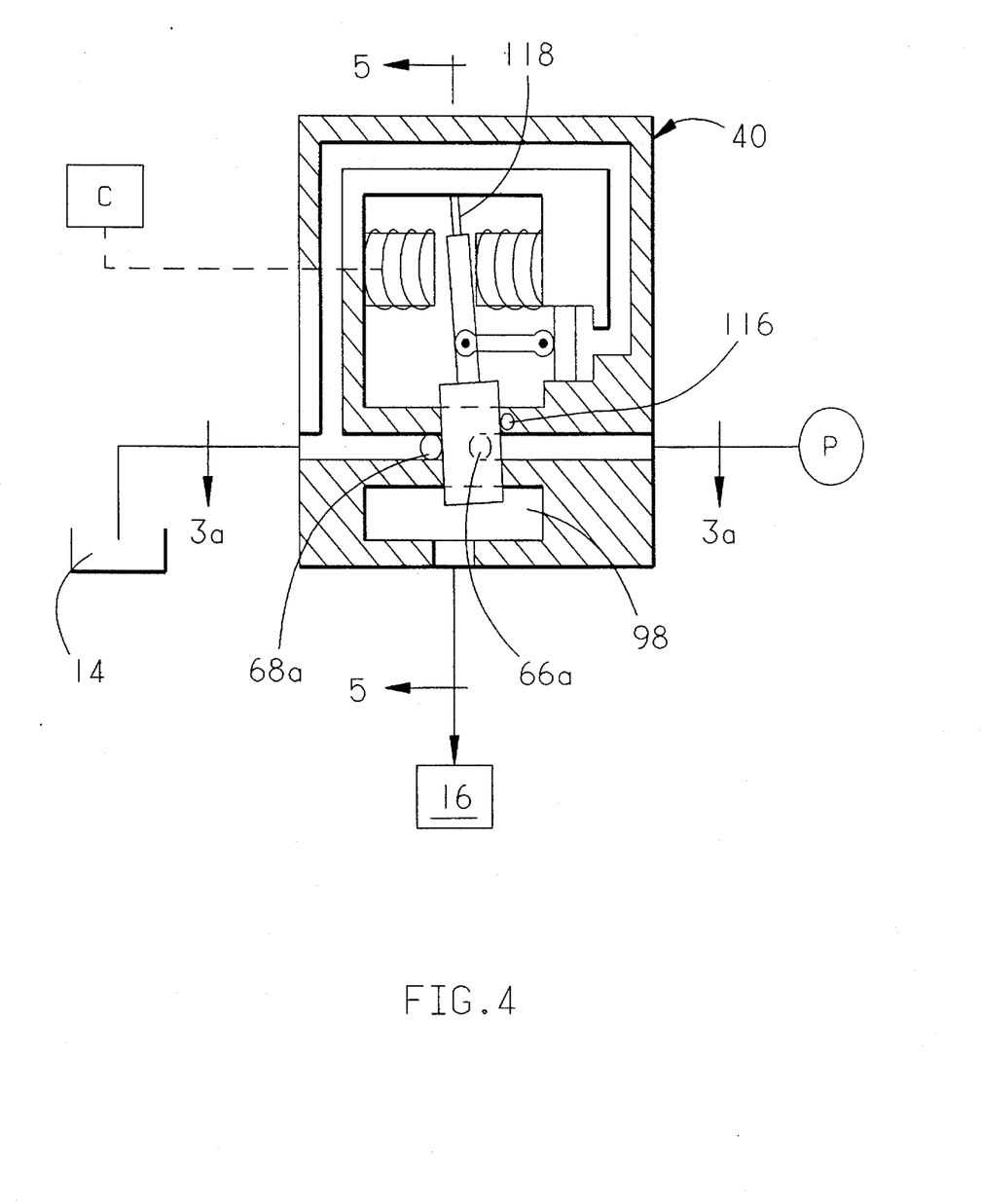
FIG. 4 is a cross-sectional view of a preferred embodiment of the valve of the hydraulic system of FIG. 1.

As illustrated in FIGS. 1–3, the body 42 also includes a metering bridge portion 62 extending through the control pressure cavity 60. This metering bridge portion 62 is essentially rectangular in cross section, and defines a pair of substantially flat, opposed, transversely spaced surfaces 64a, 64b exposed to the control pressure cavity 60. As depicted in FIGS. 1 and 4 of the exemplary embodiments, the term "transversely spaced" refers to spacing in a direction generally perpendicular to the plane of the paper. A pair of oppositely facing inlet metering orifices 66a, 66b, extending through the metering bridge portion 62, and opening into the control pressure cavity 60 through the transversely spaced surfaces 64a, 64b, provide fluid communication between the control pressure cavity 60 and said fluid inlet passage 44. In similar fashion, fluid communication between the control pressure cavity 60 and the fluid outlet passage 48 is provided by a pair of oppositely facing outlet metering orifices 68a, 68b, extending through the metering bridge portion 60 and opening into the control pressure cavity 60, through the transversely spaced surfaces 64a, 64b.

As seen in FIG. 3, inlet metering orifices 66a, 66b, are disposed about a common centerline 67 passing generally perpendicularly through a plane 80 extending generally parallel to the spaced surfaces 64a, 64b of the metering bridge portion 62 of the body member 42. Similarly, outlet metering orifices 68a, 68b, are also disposed about a common centerline 69 which passes generally perpendicularly through the plane 80 at a point laterally spaced along on the metering bridge portion 62 from the common centerline 67 of the inlet metering orifices 66a, 66b. As depicted in FIGS. 1, 3 and 4, the lateral direction refers to generally horizontal movement in or parallel to the plane of the paper.

A movable metering member 90 includes a substantially rigid elongated arm 92 pivotably attached at one end thereof to the body member 42 within the control pressure cavity 60, as illustrated at 94 in FIG. 1, and lying generally along plane 80. The distal end 96 of the elongated arm 90 is attached to a bifurcated portion 98 of the movable metering member 90. The bifurcated portion 98 includes legs 98a, 98b which straddle the metering bridge 62. The legs 98a, 98b are spaced outward from the surfaces 64a, 64b of the metering bridge 62 to form a pair of gaps 100a, 100b, between the legs 98a, 98b, and the surfaces 64a, 64b respectively of the metering bridge 62. By virtue of the construction and pivotal mounting of the movable metering element 90, as the elongated arm 92 pivots from the body member 42 along the plane 80, the bifurcated portion 98 moves transversely along said spaced surfaces 64a, 64b of the metering bridge portion 62 of the body member 42.

As shown in FIGS. 1 and 3, the legs 98a, 98b, of the bifurcated portion 98 of the movable metering member 90 are configured to at least partially overlap the inlet metering orifices 66a, 66b when the bifurcated portion 98 is moved in a generally lateral direction along the spaced surfaces 64a, 64b. By adjusting the amount of this overlap, a variable pressure drop is created in a flow of fluid entering the control pressure cavity 60 from the inlet metering orifices 66a, 66b via gaps 100a, 100b. The legs 98a, 98b of the exemplary embodiment have sufficient lateral length to simultaneously cover the inlet and outlet metering orifices 66a, 66b, 68a, 68b substantially completely. Accordingly, when the bifurcated portion is in a balanced position as depicted in FIG. 3, such that the legs 98a, 98b of the exemplary embodiment completely cover the metering orifices 66a, 66b, 68a, 68b, fluid flow into or out of the control pressure cavity through the inlet and outlet metering orifices 66a, 66b, 68a, 68b is reduced to a minimal value, or substantially cut off. Those skilled in the art will recognize, however, that in order for the valve 40 to control fluid pressure at the control port 54, rather than a flow through the control port 54, the gaps 100a, 100b are sized to allow a controlled flow of fluid through the valve 40 even with the bifurcated portion 98 positioned as shown in FIG. 3. By virtue of this arrangement, our invention provides a fluid pressure control valve 40 having a single clevis-type control stage.

In the exemplary embodiment, the actuation means for moving the bifurcated portion 98 of the movable metering member 90 generally laterally along the spaced surfaces 64a, 64b and across the metering orifices 66a, 66b, 68a, 68b, in response to control signals, includes an electro-mechanical torque motor 101. The torque motor 101 includes the elongated arm 92 and an electrical coil 102 which function respectively as the armature and stator of the torque motor 101. The coil 102 is connected to the source of control signals C to receive control signals therefrom, as shown schematically in FIG. 1. The arm 92 is fabricated at least partly from a magnetic material such that an electromagnetic field generated by the coil 102 will urge the arm to pivot in the lateral direction about an axis x—x, as shown in FIG. 2, passing transversely through the pivotal attachment at 94. The torque motor 101 is generally constructed and the arm 92 operably connected such that when a predetermined electrical control signal is impressed across the coil 102, that control signal is converted into a predetermined increase or reduction in pressure of fluid within the control pressure cavity 60.

As seen in FIG. 1, the actuation means in the valve 40 of the exemplary embodiment also includes pressure feedback means, in the form a control piston 106 operatively connected by link 112 to the arm 62. The control piston 106 is disposed in a bore 108 connected in fluid communication to the fluid outlet passage 48 by feedback signal passage 110. The control piston thus constitutes a movable wall between the control pressure cavity 60 and a second fluid cavity formed by the bore 108. By virtue of this arrangement, a differential pressure across the control piston 106 will create a net force on the control piston 106. This net force will be transmitted to the arm 92 by a control link 112 to urge the bifurcated portion 98 to move laterally along the spaced surfaces 64a, 64b of the metering bridge 62, and across the metering orifices 66a, 66b, 68a, 68b. Because the control piston 106 is exposed on one side to control pressure within the control pressure cavity 60, the net force urging lateral movement of the bifurcated portion 98 provides a pressure feedback, acting on the arm 62, and corresponding to the control pressure within the control pressure cavity 60.

The torque motor 101 and pressure feedback means of the exemplary embodiment, operatively interconnected as described above, cause the legs 98a, 98b of the bifurcated portion 98 to uncover a greater portion of the inlet metering orifices 96a, 96b in response to a control signal demanding an increase in pressure of fluid within the control pressure cavity 60. Uncovering a greater portion of the inlet metering orifices 66a, 66b reduces the pressure drop incurred by fluid as it flows into the control pressure cavity 60 through the inlet metering orifices 66a, 66b and the gaps 100a, 100b. As the pressure drop across the inlet metering orifices 66a, 66b and the gaps 100a, 100b is reduced, the pressure of the fluid within the control pressure cavity 60 will rise toward the inlet pressure within the inlet passage 44.

Conversely, the torque motor 101 and pressure feedback means of the exemplary embodiment, operatively interconnected as described above, cause the legs 98a, 98b of the bifurcated portion 98 to cover a greater portion of the inlet metering orifices 96a, 96b in response to a control signal demanding a reduction in pressure of fluid within the control pressure cavity 60. Covering a greater portion of the inlet metering orifices 66a, 66b increases the pressure drop incurred by fluid as it flows into the control pressure cavity 60 through the inlet metering orifices 66a, 66b and the gaps 100a, 100b. As the pressure drops across the inlet metering orifices 66a, 66b and the gaps 100a, 100b increases, the pressure of the fluid within the control pressure cavity 60 will be reduced from inlet pressure.

The control piston 106 is operably connected to the arm 92 by link 112, as described above, in such a manner that increasing fluid pressure within the control cavity 60 generally urges the bifurcated portion 98 to move laterally in a manner covering a greater portion of the inlet metering orifices 66a, 66b, and such that decreasing fluid pressure within the control pressure cavity 60 urges the bifurcated portion 98 to move laterally in a manner uncovering a greater portion of the inlet metering orifices 66a, 66b. The pressure feedback means of the valve 40 of the exemplary embodiment therefore provides a negative feedback, corresponding to control pressure, that operates on the arm 92 in a manner which converts the valve 40 from an integral control device to a proportional control device. The operating characteristic of the valve 40 is then such that the control pressure at port 54 has a proportional relationship to the control current from C. By providing a proportional rather than an integral relationship between control current from C and the control pressure at the control port 54, stability of the hydraulic system 10 is enhanced.

Figure 3A:
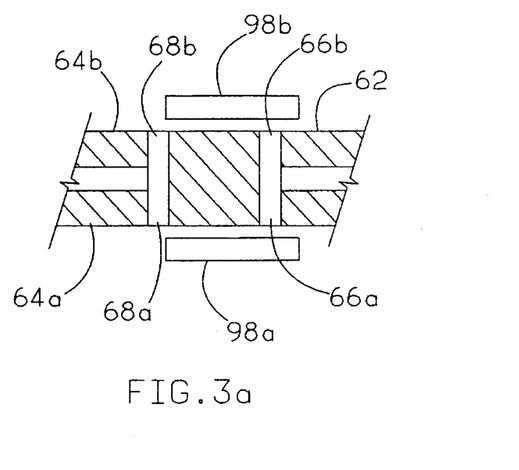
FIGS. 3a and 5 are auxiliary views depicting various elements and features of the preferred embodiment of the valve shown in FIG. 4.

As shown in FIG. 1, valve 40 of the exemplary embodiment further includes means for restoring said bifurcated portion to an initial position, as shown in FIG. 3a, and by dashed lines in FIG. 1, rather than the balanced operating position as shown by solid lines in FIGS. 1 and 3. In the initial position illustrated therein, fluid flow through the inlet metering orifices 66a, 66b is substantially cut off, and the outlet metering orifices 68a, 68b are completely uncovered. The means for restoring of the exemplary embodiment are provided in the form of a spring 114 operably connected between the valve body 42 and arm 92, and a stop pin 116 protruding from the metering bridge 64. The spring 114 is positioned to urge lateral movement of the arm 92 toward the right in FIG. 1, to the desired initial position whereat the bifurcated portion 98 of the arm the figure comes into contact with the stop pin 116, the pin 116 thus preventing further lateral movement of the bifurcated portion 98.

The valve 40 of the exemplary embodiment also includes features which compensate for changes in fluid viscosity, due to changes in operating temperature of the fluid. This compensation is provided in a straightforward manner by fabricating the bifurcated portion 98 and the metering bridge 62 at least partially from materials having different coefficients of thermal expansion. Suitable material combinations for the bifurcated portion 98 and the metering bridge 62 respectively include: a steel or an iron bifurcated portion 98, with a brass or bronze metering bridge 62; or a carbon fiber reinforced composite bifurcated portion 98 with a glass fiber reinforced composite metering bridge.

Figure 2A:
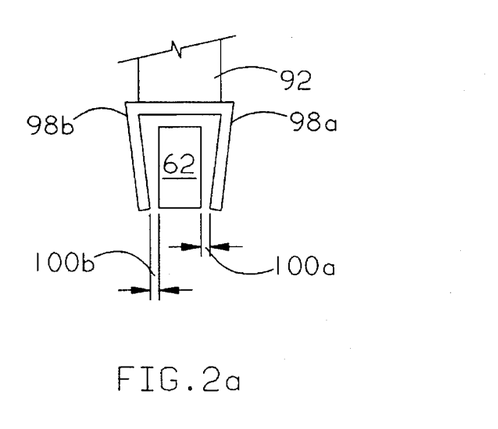
Figure 2B:
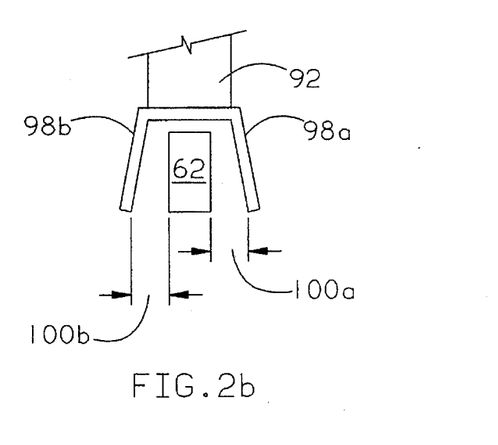

By fabricating the bifurcated portion 98 from a material having a lower coefficient of thermal expansion than the metering bridge 62, the bifurcated portion 98 will expand or contract more rapidly than the metering bridge as the fluid temperature respectively increases or decreases. As a result, the gaps 100a, 100b between the legs 98a, 98b and the surfaces 64a, 64b of the metering bridge 62 will be maximized at low fluid temperatures, and minimized at high fluid temperatures, as shown in FIGS. 2a and 2b. Widening the gaps at low temperatures reduces the fluid drag forces generated on the bifurcated portion 98 by the cold viscous fluid passing through the gaps 100a, 100b, thereby partially offsetting a reduction in frequency response due to drag which would otherwise occur if the gaps 100a, 100b were maintained at a constant width at all temperatures. Conversely, as the fluid heats up and becomes less viscous, the width of the gaps 100a, 100b is correspondingly reduced, due to the difference in thermal coefficients, thereby reducing leakage flow from the inlet metering orifices 66a, 66b to the outlet metering orifices 68a, 68b which would otherwise occur if the width of the gaps 100a, 100b were held constant as fluid temperature increases. Since the fluid drag generated on the bifurcated portion by fluid flowing in the gaps 100a, 100b is a function of viscosity, this reduction in the width of gaps 100a, 100b at elevated fluid temperatures does not adversely affect the frequency response of the valve 40. By minimizing leakage flow at high temperatures, and yet maintaining acceptable widths of the gaps 100a, 100b at low temperatures, the valve 40 of our invention provides rapid response across a wide range of fluid temperatures and viscosities.

Alternatively, compensation for changes in fluid viscosity due to changes in fluid temperature may be provided by fabricating the legs 98a, 98b of the bifurcated portion 98 as a laminated structure of materials having different coefficients of thermal expansion, as shown in FIG. 2. By forming the legs 98a, 98b as a laminated structure including a transversely outer laminate of a material having a high coefficient of thermal expansion 120, integrally joined to the transversely inner laminate 122, the legs 98a, 98b will bend inward toward the surfaces 64a, 64b of the metering portion 62 to reduce the gaps 100a, 100b, as illustrated in exaggerated fashion in FIG. 2a, when the legs 98a, 98b are exposed to high temperatures. Conversely, when the legs 98a, 98b are exposed to cold temperatures the legs 98a, 98b of the bifurcated portion 98 will bend outward to increase the gaps 100a, 100b, as shown in exaggerated fashion in FIG. 2b. The advantageous results of this embodiment of our invention are the same, therefore, as in the previously described embodiment which utilized a bifurcated portion 98 and metering bridge 62 fabricated from materials having different coefficients of thermal expansion. Acceptable material combinations for the laminates 120, 122 in the legs 98a, 98b of this embodiment of our invention include inter alia those cited with regard to the previously described embodiment utilizing a bifurcated portion 98 and metering bridge 62 fabricated from materials having different coefficients of thermal expansion.

To operate the hydraulic system of the exemplary embodiments described above, an operator of the vehicle 11 or power plant 12 first initiates a control flow of pressurized fluid from the pump P through the valve 10 to the low pressure reservoir 14. Specifically the control flow passes sequentially through: the fluid inlet passage 44; the inlet metering orifices 66a, 66b; the gaps 100a, 100b and the control pressure cavity 60; the outlet metering orifices 68a, 68b and finally out of the valve through the fluid outlet passage 48. With the coil 102 not yet energized, the bifurcated portion 98 will be in the initial position indicated in FIG. 3a. Since the inlet metering orifices 66a, 66b are substantially completely covered and the outlet metering orifices 68a, 68b are completely uncovered, in the initial position, pressure drop through the inlet metering orifices 66a, 66b and gaps 100a, 100b will be at a maximum value. Control pressure within the control pressure cavity 60 will therefore be at a minimum value. With control pressure at a minimum value, the return spring of the clutch 16 will maintain separation between the drive and driven plates 28, 30 of the clutch 16, thereby decoupling the prime mover PM from the driven apparatus D.

To engage the clutch 16, the operator causes the source of control signals C to impress an electrical signal across the coil 102 of the torque-motor 101 of the valve 10. The coil 102 creates a magnetic force urging the arm 92 to pivot to the left to approximately the balanced position, illustrated by solid lines in FIG. 1 and in FIG. 3, thereby causing the legs 98a, 98b of the bifurcated portion 98 to uncover a portion of the inlet orifices 66a, 66b, and simultaneously cover the outlet metering orifices 68a, 68b. By uncovering the inlet orifices, the pressure drop incurred by fluid entering the control pressure cavity 60 via the inlet metering orifices 66a, 66b and the gaps 100a, 100b, will be reduced. With the inlet metering orifices 66a, 66b open and the outlet metering orifices 68a, 68b covered, the control pressure within the control pressure cavity 60 will rise toward the inlet pressure within the fluid inlet passage 44. This increase in control pressure will be communicated to the clutch 16 via conduit 56, and will cause the piston 32 to clamp the drive and driven plates 28, 30 together, thereby engaging the clutch 16 in the manner described above.

To disengage the clutch 16, the operator causes the source of control signals C to de-energize, or to reverse the current flow through, the coil 102. The spring 114, and/or the coil with reversed polarity will then drive the bifurcated portion 98 back to the initial position whereat the inlet metering orifices 66a, 66b are open, and the outlet metering orifices 68a, 68b are completely covered. Pressure drop for fluid entering the control pressure cavity is once again maximized. The control pressure within the control pressure cavity 60 will bleed off through the outlet metering orifices 68a, 68b. A control pressure will be reached whereat the force exerted by the return spring in the clutch will overcome the force applied by the piston 32, allowing the spring 114 to separate the drive and driven plates 28, 30, to thereby disengage the clutch.

Although the operation of exemplary embodiment has been described above in terms of a simple on-off type of control, those skilled in the art will readily recognize that the valve 40 of our invention would preferably be operated as a modulating control valve in which control pressure in the cavity 60 is regulated in proportion to a control signal impressed across the coil 102. The ability to utilize such proportional control is provided by the feedback means of our invention, which are active throughout the operational cycle of the hydraulic system.

Specifically, as pressure within the control cavity 60 increases in response to action of the coil 102 on the arm 92, the increasing control pressure acting on the control piston 106 creates a force acting on the arm 92 which opposes the action of coil 102. This force from the control piston 106, together with the force generated by the spring 114 result in the bifurcated portion 98 taking up a balanced position, essentially as shown in FIG. 3, whereat the force from the coil 102 is balanced by the forces generated by the spring 114 and the control piston 106. By modulating the control signal to the coil 102, the position of the bifurcated portion 98 can be controlled about the balanced position of FIG. 3. In this manner, the control pressure within the control pressure cavity may be adjusted precisely and rapidly in an essentially proportional relationship to the current supplied to the coil 102.

This ability to precisely control the pressure rapidly finds particular utility and advantage in many devices, such as an anti-lock brake, or the clutch 16, wherein it may be desirable to allow a limited amount of slip between the components of such a brake or clutch. By rapidly modulating the control signal to the coil 102, the valve 40 of our invention allows the clamping force in the brake or clutch 16 to be rapidly pulsed or otherwise controlled in proportion to the control signal.

Figure 5:
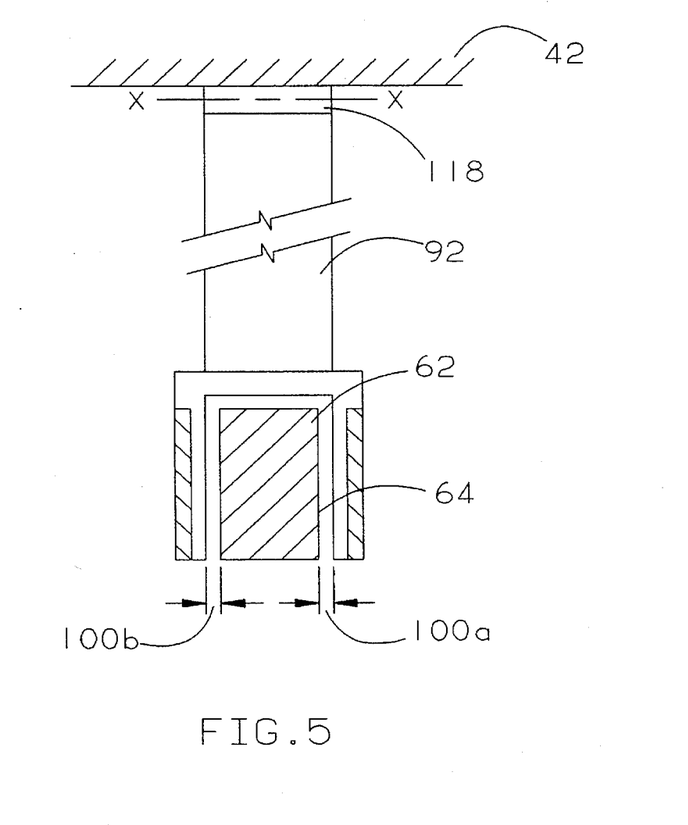

A preferred embodiment of the valve 40 of our invention is depicted in FIGS. 4 and 5, wherein like reference numbers indicate parts substantially identical to those in the exemplary embodiments described above. In this preferred embodiment of the valve 40, the pivotal attachment of the arm 92 to the body 42 is provided by a flexural hinge 118, as shown in FIGS. 4 and 5. The flexural hinge 118 has sufficient lateral stiffness to also function as leaf or finger spring, having an associated spring rate, thereby eliminating the need for separate return means such as the spring 114.

As shown in FIGS. 3a and 4, the bifurcated portion 98 of the preferred valve embodiment is also offset laterally, in a preferentially biased initial position. Specifically, the initial position of the bifurcated portion 98 in the preferred embodiment is biased such that the inlet metering orifices 66a, 66b are completely covered in the initial position, and the outlet metering orifices 68a, 68b are completely uncovered. This arrangement facilitates bleed off of control pressure within the control pressure cavity 60, thereby allowing quicker disengagement of the driven apparatus D. The minimum value of control pressure is also reduced essentially to the pressure of the low pressure reservoir 14. With this arrangement, the spring rate of the spring 114, or the flexural hinge 118, and the coil 102 can be designed such that when no current is applied to the coil 102, the arm 92 and bifurcated portion will assume the positions illustrated in FIGS. 4 and 3a, respectively. When the coil 102 is energized, the bifurcated portion 98 will move to the balanced position, as indicated in FIG. 3 and described above, by virtue of the balance of forces between the coil 102, the piston 106, the spring 114 or flexural hinge 118. Modulation of the control signal to coil 102 will then result in proportional control of the pressure to the control cavity 60.

Figure 3B:
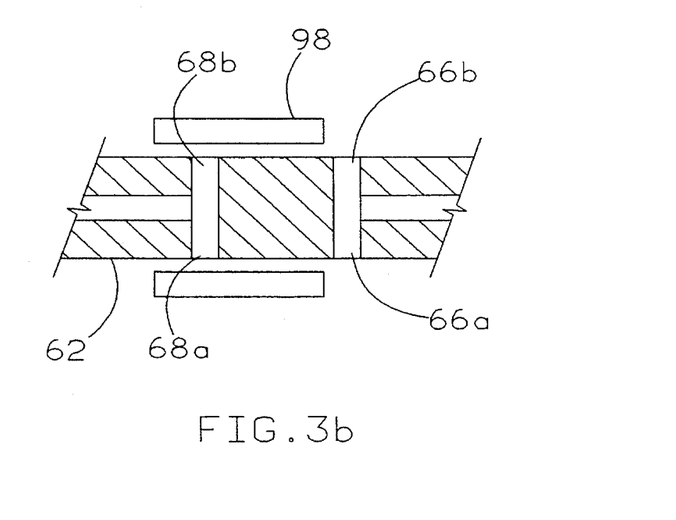
FIG. 3b is an auxiliary view of an alternate embodiment of the valve shown in FIGS. 1 or 4.

It will also be appreciated that in addition to the initial position illustrated in FIG. 3a, the spring 114 or flexural hinge 118 and the coil 102 of our invention may also be configured to bias the bifurcated portion 98 to an initial position in which the inlet metering orifices 66a, 66b are totally uncovered while the outlet metering orifices 68a, 68b are totally covered as shown in FIG. 3b, should an application of our hydraulic system 10 require such an arrangement. When the coil 102 of such an embodiment is energized, the balance of forces between the coil 102, the spring 114 or flexural hinge 118, and the control piston 106 of the valve 40 will cause the bifurcated portion 98 to move to the balanced position as illustrated in FIG. 3 and described above, thereby establishing proportional control of control pressure in response to control signals impressed across the coil 102. Alternatively, an initial position similar to that shown in FIG. 3 could be selected for applications in which it is desirable to have both the inlet and outlet metering orifices 66a, 66b, 68a, 68b covered when the coil 102 is not energized.

From the foregoing description, those skilled in the art will readily recognize that our invention overcomes problems encountered in prior hydraulic systems, by providing a stable, rapidly responding hydraulic system that provides significant advantages in either vehicular or stationary hydraulic systems operating with contaminated fluids of varying viscosity. An increase in the current in coil 102 will result in an essentially proportional increase in the pressure of the cavity 60 and clutch piston 32, and a resulting essentially proportional increase in the clutch clamping force and transmitted torque. By this means, torque transmitted via the clutch 16 can be controlled in a responsive, essentially proportional relationship to the current supplied in the coil 102.

Those skilled in the art will further recognize that, although we have described our invention herein with respect to several specific embodiments and applications thereof, many other embodiments and applications of our invention are possible within the scope of our invention as described in the appended claims. For example, the electrical torque motor 101 of the embodiments presented herein could be replaced with a pneumatic or hydraulic device. The control piston 106 and link 112 could alternatively be configured to push, rather than pull, on the arm 92 in response to increasing control pressure in the control pressure cavity 60. The feedback means could also utilize some device other than the piston 106, such as a bellows or a flexible diaphragm, to form the movable wall. Furthermore, the reference pressure could be something other than inlet pressure. For example, an aneroid bellows, or an atmospheric pressure port might be utilized as the pressure reference in other embodiments and applications of our invention.

It is understood, therefore, that the spirit and scope of the appended claims should not be limited to the specific embodiments described and depicted herein.

We claim:

1. A hydraulic system comprising, a pressure actuated hydraulic device, a source of pressurized hydraulic fluid, a low pressure reservoir, a source of control signals, and a clevis-type pressure control valve, with said clevis-type pressure control valve including:

means for receiving a flow of pressurized hydraulic fluid from said source of pressurized hydraulic fluid and delivering said flow to said low pressure reservoir; and means for converting a portion of said flow into a predetermined control pressure corresponding to control signals received from a source of control signals, and applying said control pressure to said pressure actuated hydraulic device; with said means for converting including a clevis-type fluid pressure control stage.

2. The hydraulic system of claim 1 wherein said clevis-type control includes feedback means operably connected to said clevis-type fluid control stage for controlling said clevis-type fluid pressure control stage in response to said control pressure.

3. The hydraulic system of claim 1 wherein said clevis-type fluid pressure control valve includes compensation means for compensating for changes in viscosity of said flow of pressurized fluid.

4. The hydraulic system of claim 3 wherein said compensation means are responsive to changes in temperature of said flow of pressurized fluid.

5. A hydraulic system comprising, a pressure actuated hydraulic device, a source of pressurized hydraulic fluid, a low pressure reservoir, a source of control signals and a pressure control valve, with said pressure control valve including:

means for receiving a flow of pressurized hydraulic fluid from said source of pressurized hydraulic fluid and delivering said flow to said low pressure reservoir; and means for converting a portion of said flow into a predetermined control pressure corresponding to control signals received from a source of control signals, and applying said control pressure to said pressure actuated hydraulic device;

said means for converting including:

a single, clevis-type, fluid pressure control stage; and feedback means operably connected to said clevis-type control stage for controlling said single, clevis-type fluid pressure control stage in response to said control pressure.

6. The hydraulic system of claim 5 wherein said means for converting control signals includes electro-mechanical means, and said control signals are electrical signals.

7. The hydraulic system of claim 5 wherein said pressurized fluid has a viscosity of about 1000 centistokes or greater.

8. A pressure control valve, including:

means for receiving a flow of pressurized hydraulic fluid from a source of pressurized hydraulic fluid and delivering said flow to a low pressure reservoir; and means for converting a portion of said flow into a predetermined control pressure corresponding to control signals received from a source of control signals, said means for converting including a single, clevis-type, fluid pressure control stage having feedback of said control pressure.

9. The pressure control valve of claim 8 wherein said means for converting control signals includes electro-mechanical means, and said control signals are electrical signals.

10. The pressure control valve of claim 8 wherein said pressurized fluid has a viscosity of about 1000 centistokes or greater.

11. The pressure control valve of claim 8 wherein said single, clevis-type, fluid pressure control stage includes:

a first and a second metering member, at least one of which is movable with respect to the other;

said first and second metering members being spaced from one another to define one or more gaps therebetween for flow of a portion of said flow of pressurized therethrough; and viscosity compensation means for increasing or decreasing said gaps to compensate for changes in viscosity of the pressurized fluid flowing therethrough.

12. The pressure control valve of claim 11 wherein said viscosity compensation means are provided by first and second metering members constructed from materials having dissimilar coefficients of thermal expansion, such that as the temperature of the flow of pressurized fluid changes, the first and second members will expand or contract at different rates, thereby causing the gaps therebetween to increase or decrease in a such a manner as to compensate for changes in fluid viscosity resulting from changes in the temperature of fluid flowing through said gaps.

13. The pressure control valve of claim 8 wherein:
   said clevis type control valve includes a movable metering member; and
   said feedback of control signals is provided by means exposed to said control pressure and operatively connected to said movable metering member in such a manner that said control pressure acting on said means exposed to said control pressure urges movement of said movable metering means to regulate said control pressure in a proportional relationship to said control signals.

14. The pressure control valve of claim 8 wherein said means for converting control signals further includes compensation means for compensating for changes in fluid viscosity.

15. The pressure control valve of claim 14 wherein said compensation means include temperature responsive means for adjusting said means for converting control signals in response to changes in temperature of fluid within the control valve.

16. In a fluid control system including a source of pressurized fluid, a low pressure reservoir, a source of control signals, and a pressure actuated device, a pressure control valve comprising:
   a body member defining a fluid inlet passage, a fluid outlet passage, a control pressure passage and a control pressure cavity in fluid communication with said inlet, outlet and control pressure passages;
   said inlet passage having an inlet port connected to said source of pressurized fluid to receive pressurized fluid therefrom, said outlet passage having an outlet port connected to said low pressure reservoir for returning fluid thereto, and said control pressure cavity having a control port connected to said pressure actuated device for communicating control pressure signals thereto;
   a portion of said body member further defining a pair of substantially flat, opposed, transversely spaced surfaces exposed to said control pressure cavity, with said pair of surfaces including therein a pair of oppositely facing metering orifices opening into said control pressure cavity to provide fluid communication between said control pressure cavity and said fluid inlet passage such that said pressurized fluid may enter the control pressure cavity through said metering orifices and exit said cavity through said outlet passage, thereby creating a flow of pressurized fluid through said control pressure cavity;
   a movable metering member mounted within said control pressure cavity of said body member and having a bifurcated portion thereof straddling said portion of said body defining said spaced surfaces, with said bifurcated portion being configured to at least partially overlap said metering orifices when said bifurcated portion is moved in a generally lateral direction along said spaced surfaces;
   said partial overlapping of said metering orifices by said bifurcated portion thereby creating a pressure drop in said flow of pressurized fluid entering the control pressure cavity from the metering orifices such that fluid pressure within the control pressure cavity may be selectively controlled by varying said overlapping; and
   actuation means for moving said bifurcated portion of said metering member generally laterally along said spaced surfaces and across said metering orifices to selectively control said overlapping in response to control signals received from said source of control signals, said actuation means including pressure feedback means operatively connected between said control pressure cavity and said movable metering member for urging said bifurcated portion to move laterally along said spaced surfaces and across said metering orifices in response to pressure of the fluid within the control pressure cavity; and
   said pressure control valve thereby converting said control signals received from said source of control signals into pressure control signals applied to said pressure actuated device.

17. The fluid control valve of claim 16 wherein said feedback means are operatively connected such that increasing fluid pressure within the control cavity urges the bifurcated portion to move laterally in a manner covering a greater portion of said metering orifices, and such that decreasing fluid pressure within the control pressure cavity urges said bifurcated portion to move laterally in a manner uncovering a greater portion of said metering orifices.

18. The fluid control valve of claim 16 wherein said pressurized fluid has a viscosity of about 1000 centistokes or greater.

19. A pressure control valve, including:
   means for receiving a flow of pressurized hydraulic fluid from a source of pressurized hydraulic fluid and delivering said flow to a low pressure reservoir; and
   means for converting a portion of said flow into a predetermined control pressure corresponding to control signals received from a source of control signals;
   said means for converting including:
   a single, clevis-type, fluid pressure control stage; and
   viscosity compensation means operably connected to said clevis-type control stage for controlling said single, clevis-type fluid pressure control stage in response to changes in temperature of said pressurized hydraulic fluid.

20. The pressure control valve of claim 19 further including control pressure feedback means operably connected between said control pressure and said clevis-type fluid pressure control stage for regulating said control pressure in a substantially proportional relationship to said control signals.

21. The pressure control valve of claim 19 wherein said single, clevis-type, fluid pressure control stage includes:
   a first and a second metering member, at least one of which is movable with respect to the other;
   said first and second metering members being spaced from one another to define one or more gaps therebetween for flow of a portion of said flow of pressurized therethrough; and
   said viscosity compensation means function to increase or decrease said gaps to compensate for changes in viscosity of the pressurized fluid flowing therethrough.

22. The pressure control valve of claim 21 wherein said viscosity compensation means are provided by fabricating said first and second metering members from materials having dissimilar coefficients of thermal expansion, such that as the temperature of the flow of pressurized fluid changes, the first and second members will expand or contract at different rates, thereby causing the gaps therebetween to increase or decrease in a such a manner as to compensate for changes in fluid viscosity resulting from changes in the temperature of fluid flowing through said gaps.

23. The pressure control valve of claim 21 wherein said viscosity compensation means are provided by fabricating at least one of said first and second metering members from an integrally bonded laminate of materials having dissimilar coefficients of thermal expansion, such that as the temperature of the flow of pressurized fluid changes, then at least one of said first and second members will bend toward or away from the other of said first or second metering members, thereby causing the gaps between the first and second metering members to increase or decrease in a such a manner as to compensate for changes in fluid viscosity resulting from changes in the temperature of fluid flowing through said gaps.

24. A fluid control valve comprising:
  a body member defining a fluid inlet passage having an inlet port for receiving pressurized fluid from a source of pressurized fluid, a fluid outlet passage having an outlet port for delivering said pressurized fluid to a low pressure reservoir, a control pressure passage having a control pressure port for communicating a control pressure to a pressure sensitive device and a control pressure cavity in fluid communication with said inlet, outlet and control pressure passages;
  a portion of said body member further defining a pair of substantially flat, opposed, transversely spaced surfaces exposed to said control pressure cavity, with said pair of surfaces including therein a pair of oppositely facing metering orifices opening into said control pressure cavity to provide fluid communication between said control pressure cavity and said fluid inlet passage;
  a movable metering member mounted within said control pressure cavity of said body member and having a bifurcated portion thereof straddling said portion of said body defining said spaced surfaces, with said bifurcated portion being configured to at least partially overlap said metering orifices when said bifurcated portion is moved in a generally lateral direction along said spaced surfaces, to thereby create a variable pressure drop in a flow of fluid entering the control pressure cavity from the metering orifices; and
  actuation means for moving said bifurcated portion of said metering member generally laterally along said spaced surfaces and across said metering orifices in response to control signals, said actuation means including pressure feedback means operatively connected between said control pressure cavity and said movable metering member for urging said bifurcated portion to move laterally along said spaced surfaces and across said metering orifices in response to pressure of the fluid within the control pressure cavity.

25. The fluid control valve of claim 24 wherein said feedback means are operatively connected such that increasing fluid pressure within the control cavity urges the bifurcated portion to move laterally in a manner covering a greater portion of said metering orifices, and such that decreasing fluid pressure within the control pressure cavity urges said bifurcated portion to move laterally in a manner uncovering a greater portion of said metering orifices.

26. The fluid control valve of claim 24 wherein said pressure feedback means includes:
  a second fluid cavity separated from said control pressure cavity by a movable wall, said second cavity being connected in fluid communication with said fluid outlet passage; and
  means for operatively connecting said movable wall to said movable metering means such that an application of force to said movable wall will urge said bifurcated portion to move transversely along said spaced surfaces.

27. The fluid control valve of claim 26 wherein a difference in pressure between fluid in the control pressure cavity and fluid in the outlet passage creates a force acting upon said wall and said pressure feedback means are configured to react to said force by:
  urging said bifurcated portion to move laterally to cover a greater portion of the metering orifices when the pressure of fluid within the control pressure cavity increases in comparison to the pressure of fluid within the outlet passage; and
  urging said bifurcated portion to move laterally to uncover a greater portion of the metering orifices when the pressure of fluid within the control pressure cavity decreases in comparison to the pressure of fluid within the outlet passage.

28. The fluid control valve of claim 24 wherein:
  said actuation means includes control means operatively connected to said movable metering means in such a manner that said control means will cause said bifurcated portion of said movable metering means to uncover a greater portion of said metering orifices in response to a control signal demanding an increase in pressure of fluid within the control pressure cavity, thereby decreasing pressure drop across the metering orifices in a such a manner that fluid pressure within the control pressure cavity is increased, and such that said actuation means will cause said bifurcated portion of said movable metering means to cover a greater portion of said metering orifices in response to a control signal demanding a reduction in pressure of fluid within the control pressure cavity, thereby increasing pressure drop across the metering orifices in a such a manner that fluid pressure within the control pressure cavity is reduced; and
  said pressure feedback means are operatively connected to said movable metering means in such a manner that increasing fluid pressure within the control cavity generally urges the bifurcated portion to move laterally in a manner covering a greater portion of said metering orifices and such that decreasing fluid pressure within the control pressure cavity urges said bifurcated portion to move laterally in a manner uncovering a greater portion of said metering orifices.

29. The fluid control valve of claim 24 wherein said actuation means includes electro-mechanical control means for converting a predetermined electrical control signal into said lateral movement of said bifurcated portion in such a manner that said predetermined electrical control signal causes a predetermined increase or reduction in pressure of fluid within the control pressure cavity.

30. The fluid control valve of claim 24 wherein:
  said pair of metering orifices providing fluid communication with said fluid inlet passage are inlet metering orifices;
  said spaced surfaces further include therein a second pair of oppositely facing outlet metering orifices opening into said control pressure cavity, to provide fluid communication between said control pressure cavity and said fluid inlet passage, with said outlet orifices being spaced laterally from said inlet orifices along said spaced walls; and said bifurcated portion of said movable metering member is configured to at least partially overlap said outlet metering orifices when said bifurcated portion is moved laterally along said spaced surfaces.

31. The fluid control valve of claim 30 wherein said bifurcated portion has sufficient lateral length to simultaneously cover the inlet and outlet metering orifices substantially completely, such that fluid flow into or out of the control pressure cavity through the inlet and outlet metering orifices is substantially cut off.

32. The fluid control valve of claim 31 further including means for restoring said bifurcated portion to an initial position whereat fluid flow through said inlet and outlet metering orifices is substantially cut off.

33. The fluid control valve of claim 31 further including means for restoring said bifurcated portion to an initial position whereat fluid flow through said inlet metering orifices is substantially cut off, but fluid flow through said outlet metering orifices is not substantially cut off.

34. The fluid control valve of claim 24 wherein:

said bifurcated portion is spaced from said spaced surfaces to form a pair of gaps between said bifurcated portion and said spaced surfaces; and said bifurcated portion is fabricated from materials having different coefficients of thermal expansion, with said materials being integrally joined to form a laminated structure, such that when exposed to hot temperatures the bifurcated portion will bend inward toward the spaced surfaces to reduce said gaps, and when exposed to cold temperatures the bifurcated portion will bend outward to increase the gaps, thereby providing compensation for changes in viscosity resulting from changes in temperature of fluids flowing through the gaps.

35. The fluid control valve of claim 24 wherein said metering orifices are disposed about a common centerline passing generally perpendicularly through a plane extending generally parallel to said spaced surfaces of said body member, and said movable metering member includes a substantially rigid elongated arm lying generally along said plane, with said elongated arm being pivotably attached at one end thereof to said body member, and attached at a distal end thereof to said bifurcated portion of said movable metering member in such a manner that as said elongated arm pivots from said body member along said plane, said bifurcated portion moves transversely along said spaced surfaces of said portion of said body member.

36. The fluid control valve of claim 35 wherein said actuation means include electro-mechanical means operatively connected between said body member and said arm for urging said arm to pivot and move along said plane in response to said control signals.

37. The fluid control valve of claim 36 further including positional restoring means operatively connected between said body member and said arm for urging said arm to return to a predetermined initial position along said plane.

38. The fluid control valve of claim 24 wherein said metering orifices are disposed about a common centerline passing generally perpendicularly through a plane extending generally parallel to said spaced surfaces of said body member and said movable metering member includes an elongated arm lying generally along said plane, with said elongated arm being fixedly attached at one end thereof to said body member by a flexural hinge member, and attached at a distal end thereof to said bifurcated portion of said movable metering member in such a manner that as said flexural hinge member bends along said plane, said bifurcated portion moves transversely along said spaced surfaces of said portion of said body member.

39. The fluid control valve of claim 38 wherein said actuation means include electro-mechanical means operatively connected between said body member and said arm for urging said arm to apply bending forces to said flexural hinge member in a manner causing said flexural hinge member to bend along said plane in response to said control signals.

40. The fluid control valve of claim 38 wherein said flexural hinge member is configured as a spring member for resisting bending forces applied thereto and for urging said arm to return to an predetermined initial position along said plane whenever such bending forces are applied to said arm.

* * * * *